(12) United States Patent
de Kok

(10) Patent No.: US 6,545,944 B2
(45) Date of Patent: Apr. 8, 2003

(54) METHOD FOR ACQUIRING AND PROCESSING OF DATA FROM TWO OR MORE SIMULTANEOUSLY FIRED SOURCES

(75) Inventor: Robbert Jasper de Kok, Houston, TX (US)

(73) Assignee: Westerngeco L.L.C., Houston, TX (US)

(*) Notice: Subject to any disclaimer, the term of this patent is extended or adjusted under 35 U.S.C. 154(b) by 0 days.

(21) Appl. No.: 09/870,289

(22) Filed: May 30, 2001

(65) Prior Publication Data

US 2002/0181328 A1 Dec. 5, 2002

(51) Int. Cl.[7] ................................................ G01V 1/00
(52) U.S. Cl. .............................. 367/56; 114/72; 702/17
(58) Field of Search ............................ 114/242; 367/56; 702/17

(56) References Cited

U.S. PATENT DOCUMENTS

| | | | |
|---|---|---|---|
| 3,744,021 A | 7/1973 | Todd | 340/15.5 TC |
| 4,159,463 A | 6/1979 | Silverman | 340/15.5 CR |
| 4,168,485 A | 9/1979 | Payton et al. | 367/41 |
| 4,636,956 A | 1/1987 | Vannier et al. | 364/421 |
| 4,715,020 A | 12/1987 | Landrum et al. | 367/38 |
| 4,953,657 A | 9/1990 | Edington | 181/111 |
| 5,717,655 A | 2/1998 | Beasley | 367/53 |
| 5,721,710 A | 2/1998 | Sallas et al. | 367/41 |
| 5,822,269 A | 10/1998 | Allen | 367/41 |
| 5,924,049 A | * 7/1999 | Beasley et al. | 367/56 |
| 5,973,995 A | 10/1999 | Walker et al. | 367/20 |

FOREIGN PATENT DOCUMENTS

WO    WO01/75481 A2    10/2001

* cited by examiner

*Primary Examiner*—Gregory J. Toatley, Jr.
(74) *Attorney, Agent, or Firm*—David S. Figatner; Madan, Mossman & Sriram, P.C.

(57) ABSTRACT

A method of seismic surveying and seismic data processing using a plurality of simultaneously recorded seismic-energy sources. An activation sequence for each of said plurality of seismic energy sources may be determined such that energy from seismic sources may be recorded simultaneously and seismic energy responsive to individual seismic sources separated into separate source records. The seismic sources are activated using an activation sequence, the recorded seismic energy in the shot recordings may be separated into source recordings responsive to individual seismic sources. The source records may be derived from the shot records using a combination of shot record summations, inversions and filtering.

29 Claims, 6 Drawing Sheets

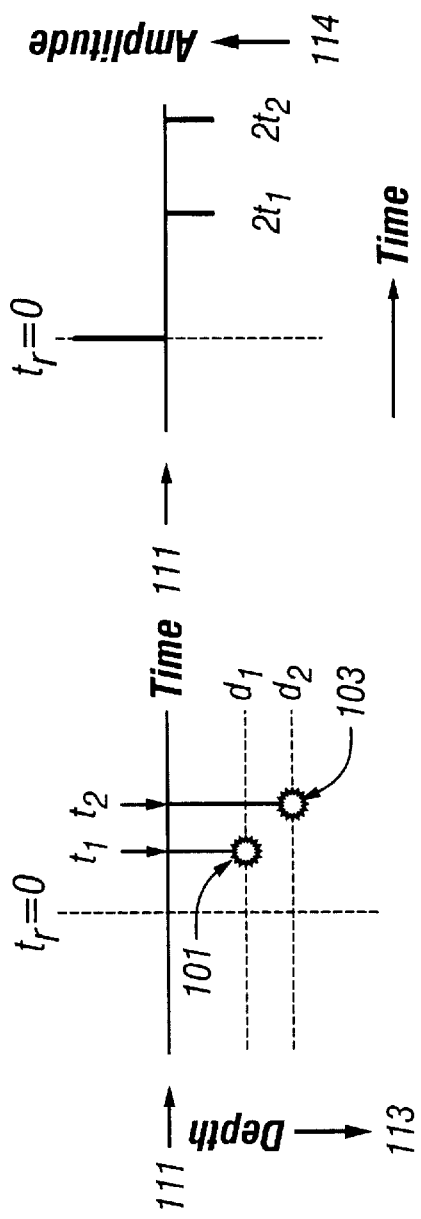
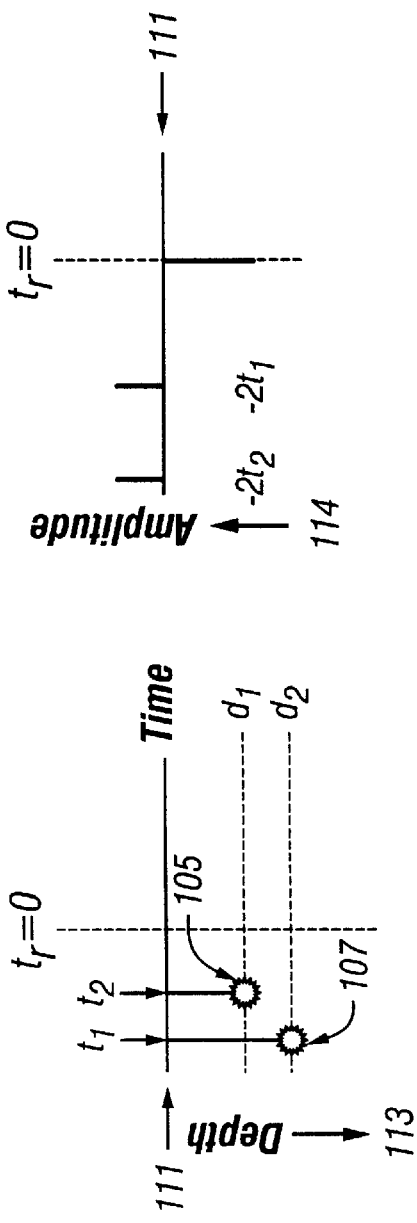
FIG. 1A
FIG. 1B

METHOD FOR ACQUIRING AND PROCESSING OF DATA FROM TWO OR MORE SIMULTANEOUSLY FIRED SOURCES

FIELD OF THE INVENTION

This invention relates to the field of geophysical prospecting and, more particularly, to a method for generating seismic energy for seismic surveys.

BACKGROUND OF THE INVENTION

In the oil and gas industry, geophysical prospecting techniques are commonly used to aid in the search for and evaluation of subterranean hydrocarbon deposits. Generally, a seismic energy source is used to generate a seismic signal that propagates into the earth and is at least partially reflected by subsurface seismic reflectors (i.e., interfaces between underground formations having different acoustic impedances). The reflections are recorded by seismic detectors located at or near the surface of the earth, in a body of water, or at known depths in boreholes, and the resulting seismic data may be processed to yield information relating to the location of the subsurface reflectors and the physical properties of the subsurface formations.

U.S. Pat. No. 3,744,021 to Todd discloses the firing of low energy shots for shallow, high resolution profiling in combination with high energy shots for deep seismic profiling. The method only allowed for a small overlap of shallow and deep profiling recording cycles, merely maximizing the number of shots in a given period of time while minimizing interference. U.S. Pat. No. 5,973,995 to Walker and Lindtjeorn discloses a method for simultaneous recording of deep and shallow profiling data. Their main objective was to use different cables in one and the same shooting configuration.

U.S. Pat. No. 4,168,485 to Payton, et al, teaches a full simultaneous signal generation method. This patent implements orthogonal pseudorandom sequences for vibratory sources allowing for the separation of the source signals during the correlation process. Experiments with pseudo random firings of airguns have also been conducted, however no global successes have been reported. Others have experimented with phase encoding of vibratory sources. Other patents attempting full simultaneous signal generation include U.S. Pat. No. 4,715,020 to Landrum and U.S. Pat. No. 5,822,269, to Allen. The problem with these types of encoding methods is that harmonic distortion is not rejected or is only partly rejected.

U.S. Pat. No. 4,159,463 to Silverman describes the use multiple vibrators, repeatedly vibrating at stationary locations, generating opposite polarity sweeps in encoded sequences. However, Silverman does not include the use of vibrators for firing a single shot or sweep at one set of locations while generating other polarity changing sweeps at another set of locations.

U.S. Pat. No. 5,721,710 to Sallas teaches a generalized method for the simultaneous use of an arbitrary number of vibrators, sweeping a specified number of times in constant geometry. In this method, the separation of sources is achieved through the repeated inversion of two-dimensional (source versus shot) matrices at constant frequencies.

A general limitation when using pseudo-random sequences and sweep signals is the length of the energy emission, rendering the method less attractive for dynamic (marine) recording. Methods that are applicable to explosive and implosive types of sources are limited. U.S. Pat. No. 5,924,049 to Beasley and Chambers teaches a processing method to separate the signals from different sources when fired simultaneously from two ends of recording cable(s). The method is not suitable for the simultaneous recording of signals arriving from approximately the same direction.

A method disclosed by U.S. Pat. No. 4,953,657 to Edington discloses use of a suite of time delay differences between sources. To enhance the signal from a particular source, the corresponding signals are aligned and stacked. The contributions from the other source(s) are not aligned and do not stack to full strength. The remaining undesired energy is further attenuated in the frequency domain.

The high cost of seismic acquisition necessitates that compromises in the field be made, both on land and offshore. The common practice is to acquire data at a low but still acceptable areal density of surface locations. On land both the source and the receiver deployment may be less than optimal while in the marine environment the source deployment is routinely compromised and often lower than desirable. Often, data quality seems initially acceptable for the intended purpose, such as reconnaissance, new field exploration, wildcat drilling, etc. However, when more detailed studies like hydrocarbon identification and reservoir characterization are needed at a later stage, the data quality proves insufficient. In both land and marine environments there is a compelling case for the efficient acquisition of seismic data at a denser grid of locations. The use of multiple sources firing simultaneously into the same recording system is an attractive option to increase the field efforts at relatively low incremental cost. Simultaneous firing is particularly economical when additional sources can easily and cheaply be deployed, such as vibrator groups on land and airgun arrays in a marine situation. Unfortunately, the separation of the information pertaining to the individual sources may be cumbersome and/or imperfect.

It would be desirable to have a method of simultaneous shooting with impulsive sources. The present invention satisfies that need.

SUMMARY OF THE INVENTION

A method of seismic surveying using a plurality of simultaneously recorded seismic energy sources. An activation sequence for each of said plurality of seismic energy sources may be determined such that energy from separate seismic source positions may be recorded simultaneously and seismic energy responsive to individual seismic sources separated into separate source records. The seismic sources are activated using an activation sequence, the recorded seismic energy in the shot recordings may be separated into source recordings responsive to individual seismic sources. The source records may be derived from the shot records using a combination of shot record summations, inversions and filtering.

The present invention offers embodiments for simultaneous source separation applicable to both marine and land environments. One embodiment utilizes source signals coded with positive and negative polarities, but without the restriction of stationary locations and without the restriction of vibratory sources. Another embodiment utilizes source signals with time-delays between source activation times. These embodiments achieve enhancement of the desired source energy through the alignment and combination of the coded signals. In the source discrimination process, an equal amount of data as recorded and of data, polarity changed in processing, may be used. This aspect allows that undesired source energy and distortion energy are effectively cancelled, which are advantages over the prior art.

One embodiment of the present invention described in this disclosure is based primarily on source polarity encoding, while another embodiment is based primarily on source time shift encoding. It should be noted here that in the first part of the detailed description, the source signal has been simplified to a spike representation, or in other words it has been deconvolved for the direct source signature. This implies that the schematic data shown in the relevant figures should be convolved with the direct source signature to obtain the actual responses.

BRIEF DESCRIPTION OF THE DRAWINGS

The present invention and its advantages will be better understood by referring to the following detailed description and the attached drawings in which:

FIG. 1A illustrates a downward firing source comprising two source elements.

FIG. 1B illustrates an upward firing source comprising two source elements.

DETAILED DESCRIPTION OF THE PREFERRED EMBODIMENTS

Figure 2:
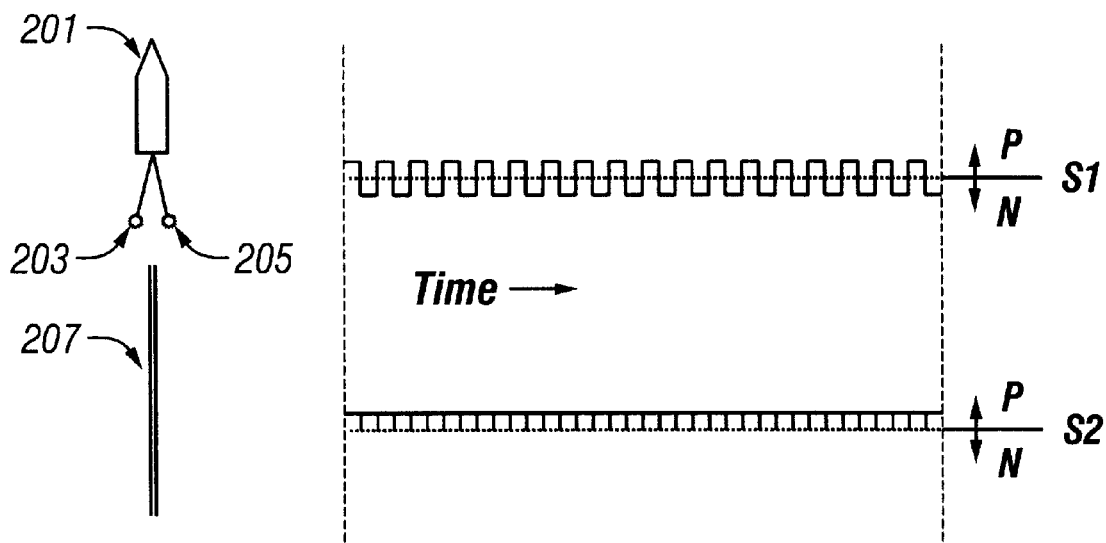
FIG. 2 illustrates a two source shooting geometry and simultaneous signal-coding scheme.

The present invention is a method for acquiring seismic data using simultaneously activated seismic energy sources. This invention may enable seismic surveys to be acquired more rapidly than conventional surveys. Other advantages of the invention will be readily apparent to persons skilled in the art based on the following detailed description. To the extent that the following detailed description is specific to a particular embodiment or a particular use of the invention, this is intended to be illustrative and is not to be construed as limiting the scope of the invention.

Except for the seismic vibrator, changing the polarity of a seismic source has not generally been considered to be a viable option and hence polarity encoding has not been used in all seismic acquisition environments. However, in the marine situation, incorporating the negative sea surface reflection into the method can approximate a polarity-reversed impulse. Referring to a standard airgun array, the far field source signature is composed of a positive pressure pulse followed by a negative pulse from the sea surface reflection. The negative pulse, called the ghost, is time separated from the positive pulse by a time shift that may be referred to as the ghost time delay. This makes the far-field signal look like an anti-symmetric wavelet. The ratio of the constituent positive to negative peaks can, however, be changed by using vertically staggered arrays operated in so called 'end fire' mode. By directing energy downwards or upwards, the positive direct pulse or the negative reflected pulse can be enhanced respectively. The left side of FIG. 1A shows a downward firing source comprised of two source elements. Time is the horizontal axis 111; depth is the vertical axis 113. The shallower source element 101 is activated at time $t_1$, emitting energy in all directions, thereby creating a pressure wave front. At the moment the pressure wave front arrives at the deeper source element 103, that element is activated at time $t_2$, thereby enhancing the downward traveling signal. The activation sequence time delay is computed by determining the time difference between $t_1$ and $t_2$, the pressure wave front travel time between source elements. The upward traveling wave fronts from the time separated sources propagate such that the wave fronts do not reinforce. The impulse responses are displayed with arbitrary amplitude 114 on the right hand side of FIG. 1A, with time zero $t_r$ (reference time) chosen to correspond to the sea surface. The impulse responses at the right hand side of FIG. 1A are as measured vertically below the sources, but redatumed such that time zero corresponds to the sea surface.

In the upward firing source, as depicted in FIG. 1B, the guns of the deeper source element 107 fire first while the shallower guns 105 are time delayed until the upward traveling wave-front has arrived at that shallower depth level. This way the up-going wave front is enhanced. Again, on the right side of FIG. 1B, the reference time $t_r$ in the impulse response of the up-going wave front is chosen to be the sea surface. Although more than two source elements can be deployed for creating enhanced positive and negative signals, and for enhancing directionality of signals, only two are used in the illustration of FIG. 1A and FIG. 1B.

FIG. 2 shows the sequences of two sources firing simultaneously with polarity coding. It should also be noted that the number of sources is not limited to two. Larger numbers of sources can be used in combination with longer source activation or coding sequences. FIG. 2 shows a source vessel 201 towing sources 203 and 205. A source vessel 201 may also tow a streamer containing sensors for receiving source signals, for example streamer 207. In FIG. 2, Source 203 emits S1, in which positive (P) and negative (N) polarity source signals alternate as depicted by the positive and negative polarity representation through time. S1 may correspond to the example of alternately using a pair of source elements in the configuration shown in FIG. 1A with a pair of source elements in the configuration shown in FIG. 1B. Source 205 emits positive signals S2 only. S2 corresponds to using a pair of source elements in the configuration shown in FIG. 1A. The sources may have arbitrary positions in a seismic survey, but in the example of FIG. 2 they are located closely together like in a flip-flop shooting configuration.

The seismic energy returned from shot records containing multiple source position energy must be separated into source records containing energy responsive to the individual seismic sources. The separation of individual source contributions into source records (as opposed to shot records) is achieved during processing, preferably in the common mid-point (CMP) domain but any other domain where the contributions from successive shot records are present may be used. In the domain selected, a form of mixing or filtering may be applied to remove the undesired source position contribution seismic energy. In the example of FIG. 2 for instance, a two-trace mix with equal weights or a three trace running mix with weights ½, 1 and ½ may greatly attenuate the polarity changing signals from Source S1. It should be noted here that all multi-trace operations such as DMO, stacking, migration, etc. have a mixing effect on the data. Thanks to the polarity changing nature of the undesired data, these multi-traces processes will also reduce undesired source contributions.

In order to enhance the signal from Source S2 and attenuate signals from Source S1, successive shots are polarity reversed during processing. Hereby signals from S1 will become positive in polarity for all shots, while the signals from Source S2 will alternately become positive and negative.

Figure 4:
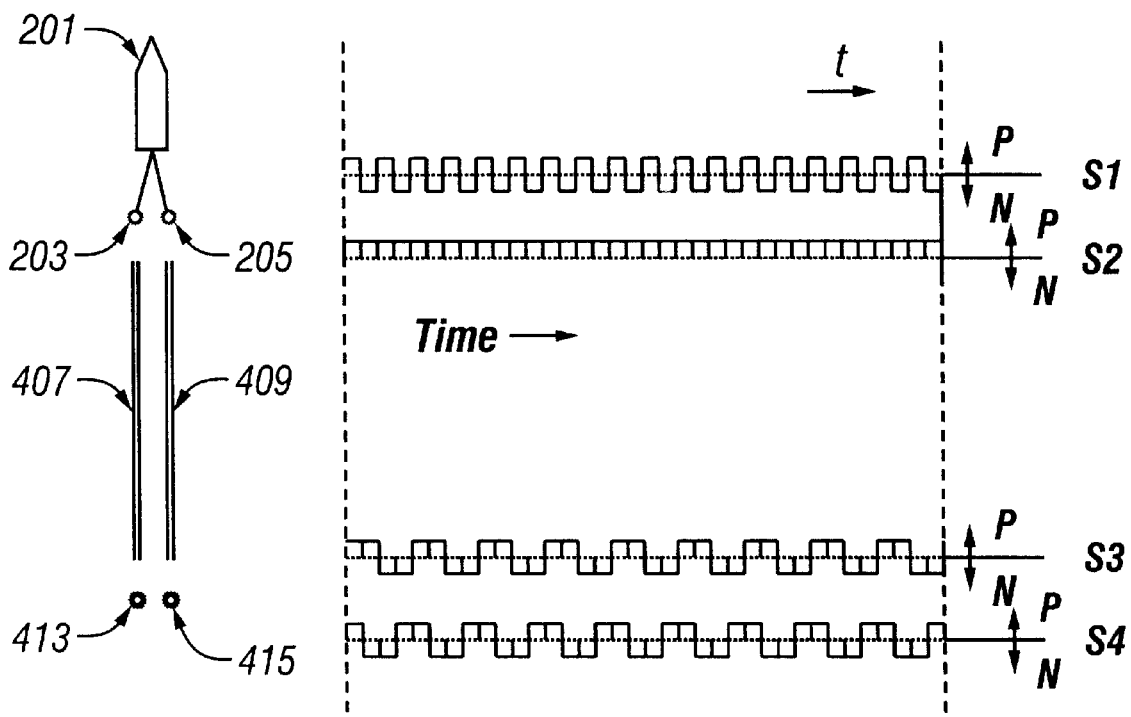
FIG. 4 illustrates a four source shooting geometry and simultaneous signal-coding scheme.
Figure 3:
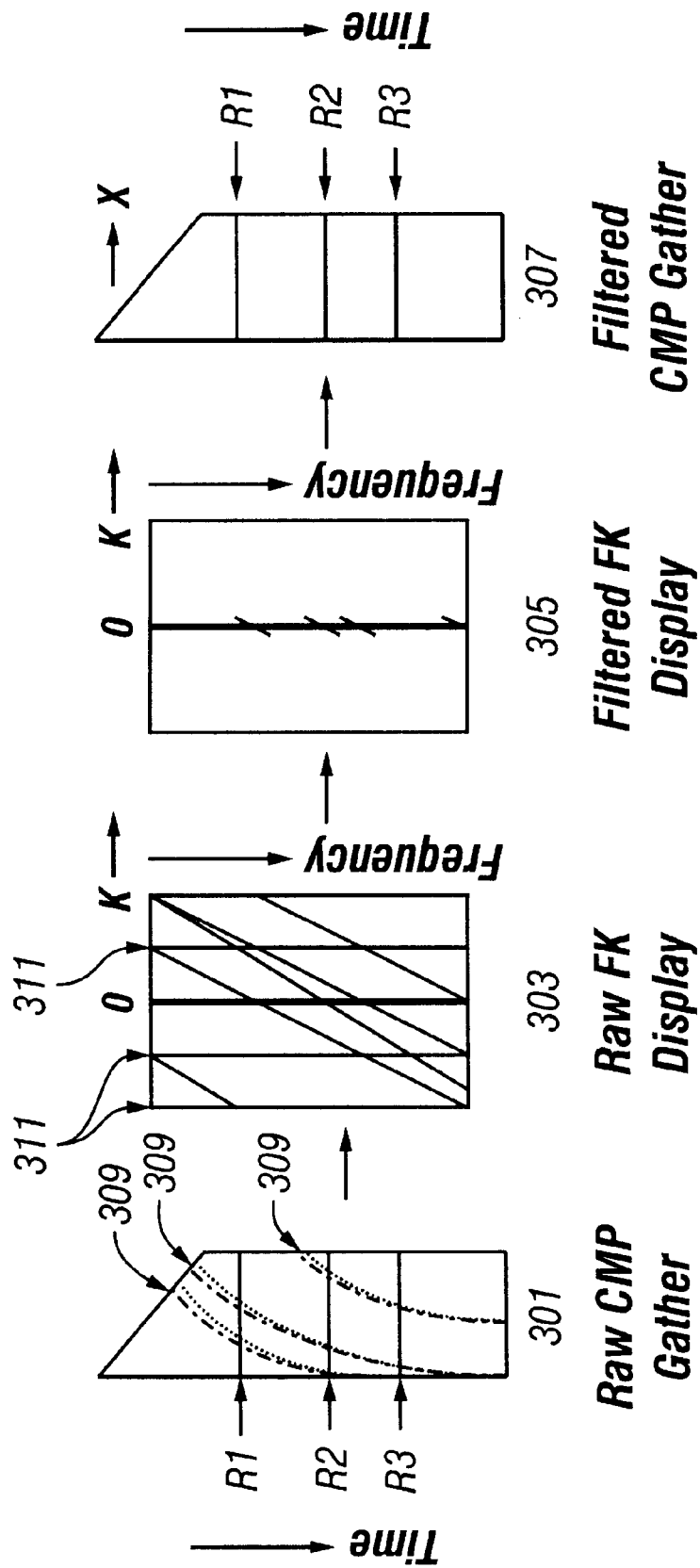
FIG. 3 illustrates discrimination of simultaneous sources by data processing in the FK domain.

Although data mixing can take place at various stages during processing, the preferred domain is the CMP gather where the desired data are sorted to offset and normal move-out (NMO) corrected as shown schematically on the left panel 301 in FIG. 3. The first panel 301 of FIG. 3 is a depiction of an NMO corrected CMP gather showing flattened reflection events R1, R2 and R3. There are also seismic event contributions 309 from two additional sources located at the tail end of the cable, for instance sources 413 and 415 as depicted in FIG. 4. The NMO corrected data are transformed to the Frequency-Wavenumber (FK) domain representation 303 where attenuation of undesired energy can take place by passing wavenumber (K) values around the K=0 axis only. Panel 305 is the FK domain representation after filtering; panel 307 is the CMP gather after transforming from the FK domain back to CMP containing reflection events R1, R2 and R3 with other unwanted seismic energy suppressed or absent.

FIG. 4 depicts a four source (203, 205, 413, 415) shooting arrangement with two receiver cables (407, 409). Front source 203 emits signal sequence S1 and 205 emits signal sequence S2, may be as previously shown in FIG. 1A and FIG. 1B. Source vessel 201 may also tow two streamers containing sensors for receiving source signals, for example streamers 407 and 409. FIG. 4 shows two sources, 413 and 415, following the streamers. Source 413 may have a signal sequence S3 as depicted in FIG. 4. Two shots of one polarity, for instance positive polarity, are followed by two shots of negative polarity before two shots of positive polarity are again initiated. The signal sequence S4 for another source, for instance 415, is the same as S3 except the polarity sequence is offset one step either direction compared to S3.

In the configuration of FIG. 4 the two sources 203 and 205 preceding streamers 407 and 409 are relatively close to each other, and also sources 413 and 415 at the back of the streamers 407 and 409 are in relatively close proximity. As a consequence, when processing for desired front source 205, the data from undesired source 203 have moveout that is approximately the same as that of the desired front source 205. However, the corresponding energy from each front source projects at different locations in the FK domain. Because the undesired data is changing in polarity as outlined above, it has zero average amplitude and thus has no energy at K=0. Instead, the polarity swapping data represent a periodic function in X and projects onto constant K values, 311 in FIG. 3, pertaining to the length of a period. Transformation back to the TX domain, after any necessary FK filtering, yields the desired data absent the undesired source contributions, for example as is shown on panel 307 in FIG. 3.

After polarity reversing successive shot recordings during processing, this process can then be repeated for the other sources. For instance, flipping alternate records will cause signals from source 203 to be in phase and those from other sources to be out of phase. Flipping (inverting) the signals from the $3^{rd}$ and $4^{th}$ shot and the $7^{th}$ and $8^{th}$ shot and so on will cause signals from source 413 to be in phase and those from the other sources to be out of phase in successive recordings. There are four separable sources shown in the configuration of FIG. 4, separable by using stacking, filtering or combinations of both stacking and filtering.

Figure 5A:
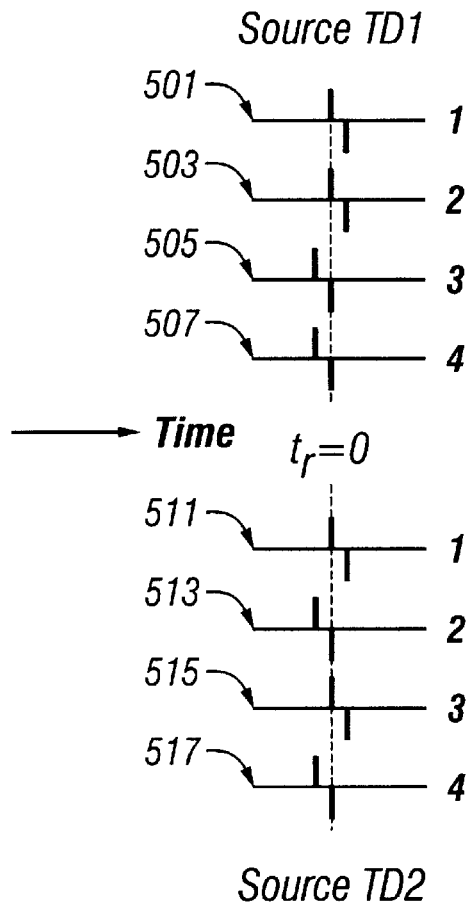
FIGS. 5A, 5B and 5C illustrate a source discrimination scheme for two sources.

Another embodiment of the present invention entails time delay encoding. The time delay encoding technique relies on programmed time delays in the field and polarity decoding in the processing center. The time shifts for encoding may be arbitrarily chosen per source, but they should preferably be equal to the ghost time delay in the marine case. In the land case the delay should be less than the reciprocal of the maximum frequency of interest. The enhancement of data pertaining to a particular desired source is accomplished through equalizing the polarity of corresponding signal components and to align and average (mix or stack) the responses. This principle is illustrated with the impulse response representations of FIG. 5A for a marine application. The impulse response representations may be, for example, where the sea surface reflection having opposite polarity follows a primary source impulse. Here, the primary source is represented as a positive polarity followed by a ghost of negative polarity with a delay time. In FIG. 5A (and in FIG. 6 and FIG. 7), only the individual source firing sequences are shown and not their combined responses. In FIG. 5A, Source TD1 and Source TD2, being sequential series of simultaneous shots, have different delay codes for successive shots (numbered 1 to 4 for each simultaneously activated source). The time delays in these figures are relative to an arbitrary reference, here labeled $t_r$=0, represented by the vertical dashed lines. For example, simultaneously fired shot 1 from TD1 (501) and shot 1 of TD2 (511) are initiated with no relative time delays between them, but shot 2 from TD2 (513) is initiated before shot 2 of TD1 (503), the time separation between the initiation of shot 2 of TD2 (513) relative to shot 2 of TD1 (503) being the time delay determined or chosen for the acquisition program, which may for example, be the ghost delay. In FIG. 5A for Source TD1 the shot 1 (501) and shot 2 (503) representations are of positive delay times relative to the reference time. The FIG. 5A Source TD1 shot 3 (505) and shot 4 (507) representations are for negative delay times. For FIG. 5A Source TD2 shot 1 (511) and shot 3 (515) have positive delay times while shot 2 (513) and shot 4 (517) have negative delay times. The polarity of a particular source is determined by the polarity of the impulse coinciding with the reference time $t_r$=0. The source with no delay is considered positive, the source with a negative delay is considered negative.

Here the result of polarity decoding to enhance and separate energy for the Source TD1 shot series from the shot series of Source TD2 consists of reversing the contributions from shot 3 (505, 515) and shot 4 (507, 517), which causes energy from Source TD1 to reinforce and that of Source TD2 to cancel after mixing, K-filtering or stacking (also here the CMP gather may be the preferred domain to execute the source discrimination). This result is demonstrated in FIG. 5B where the impulse response of the processed shot series is shown. In FIG. 5C, shot 2 (503, 513) and shot 4 (507, 517) are reversed causing energy from Source TD2 to reinforce and energy from Source TD1 to cancel.

Figure 5B:
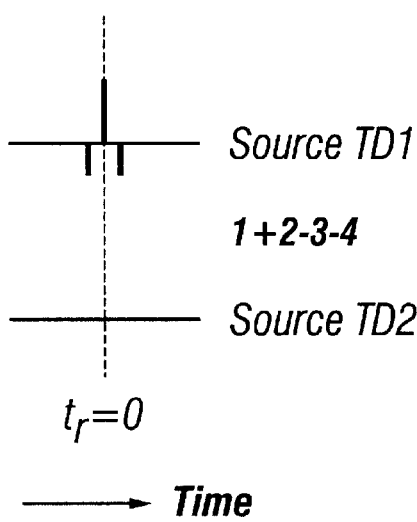
Figure 5C:
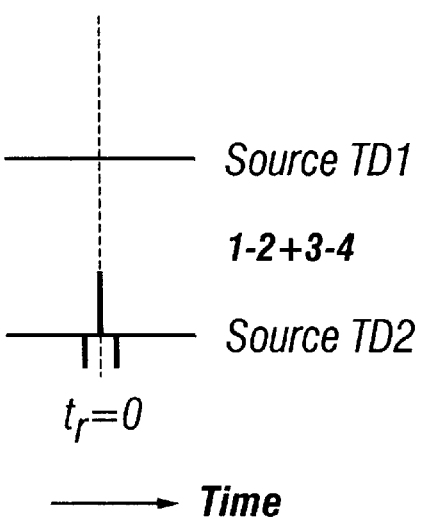
Figure 6B:
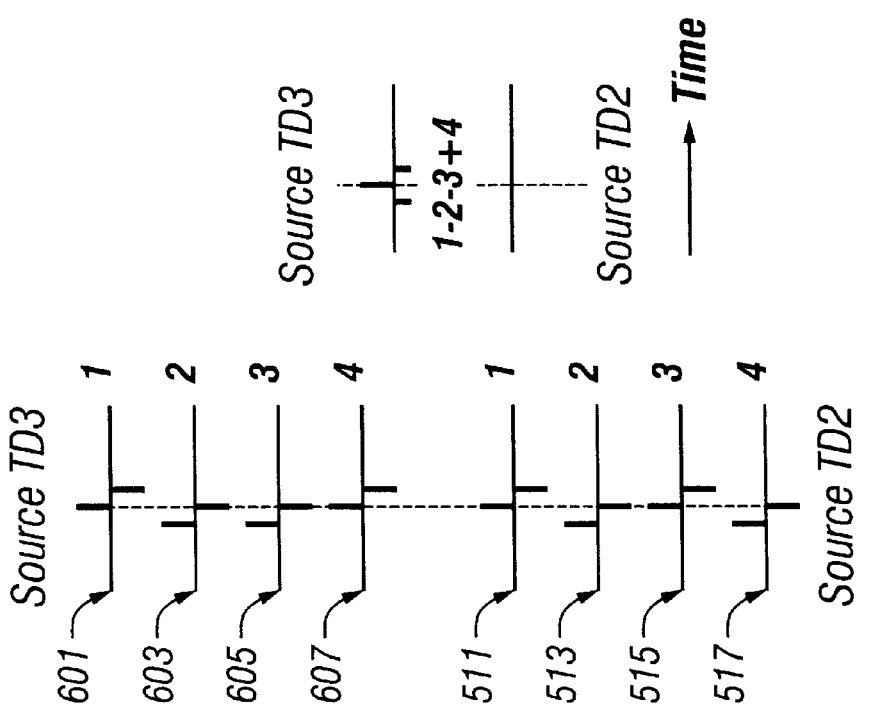
FIGS. 6A and 6B illustrate an alternate source discrimination scheme for adding a third source to the two sources of FIGS. 5.
Figure 6A:
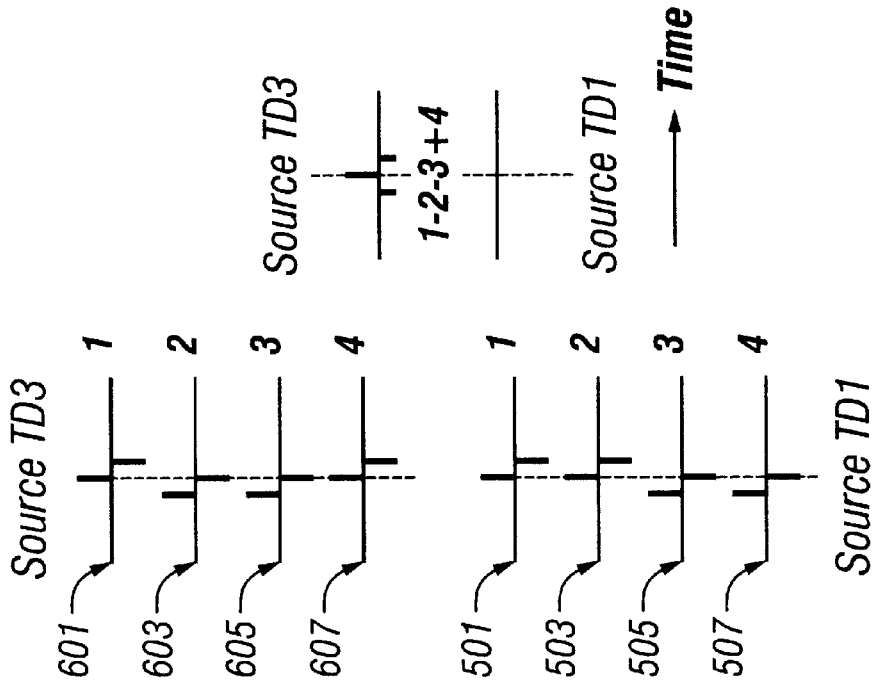

When using a sequence of four shots as in FIG. 5A and FIG. 5B, the method can accommodate three different sources. The coding of a third source, Source TD3, is shown in FIG. 6A and FIG. 6B and consists of positive delay times for shot 1 (601) and shot 4 (607) with negative relative delay times for shot 2 (603) and shot 3 (605). In this case, the decoding for Source TD3, the third source, is achieved by inverting shot 2 (503, 513 and 603) and 3 (505, 515 and 605). It may be observed that both Source TD2 in FIG. 6A and Source TD1 in FIG. 6B do not pass energy after mixing, K-filtering or stacking. If it is desirable to use more than three simultaneous sources, the sequence can be changed to consist of cycles longer than four shots.

Although the signals used in FIG. 5A, FIG. 5B, FIG. 6A and FIG. 6B have equal amplitude and ghost delays, this is not a requirement for the method. All sources may be different both in amplitude and ghost delay. This implies that simultaneous shooting for deep and shallow profiling is also feasible.

Also, simultaneous shooting of land sources other than Vibroseis is feasible with the time delay coding method. The signal response after the application of this method is similar to that of that of the ghost in a marine environment, i.e., the original response compounded with a delayed (or advanced) opposite response.

Figures 7A, 7B:
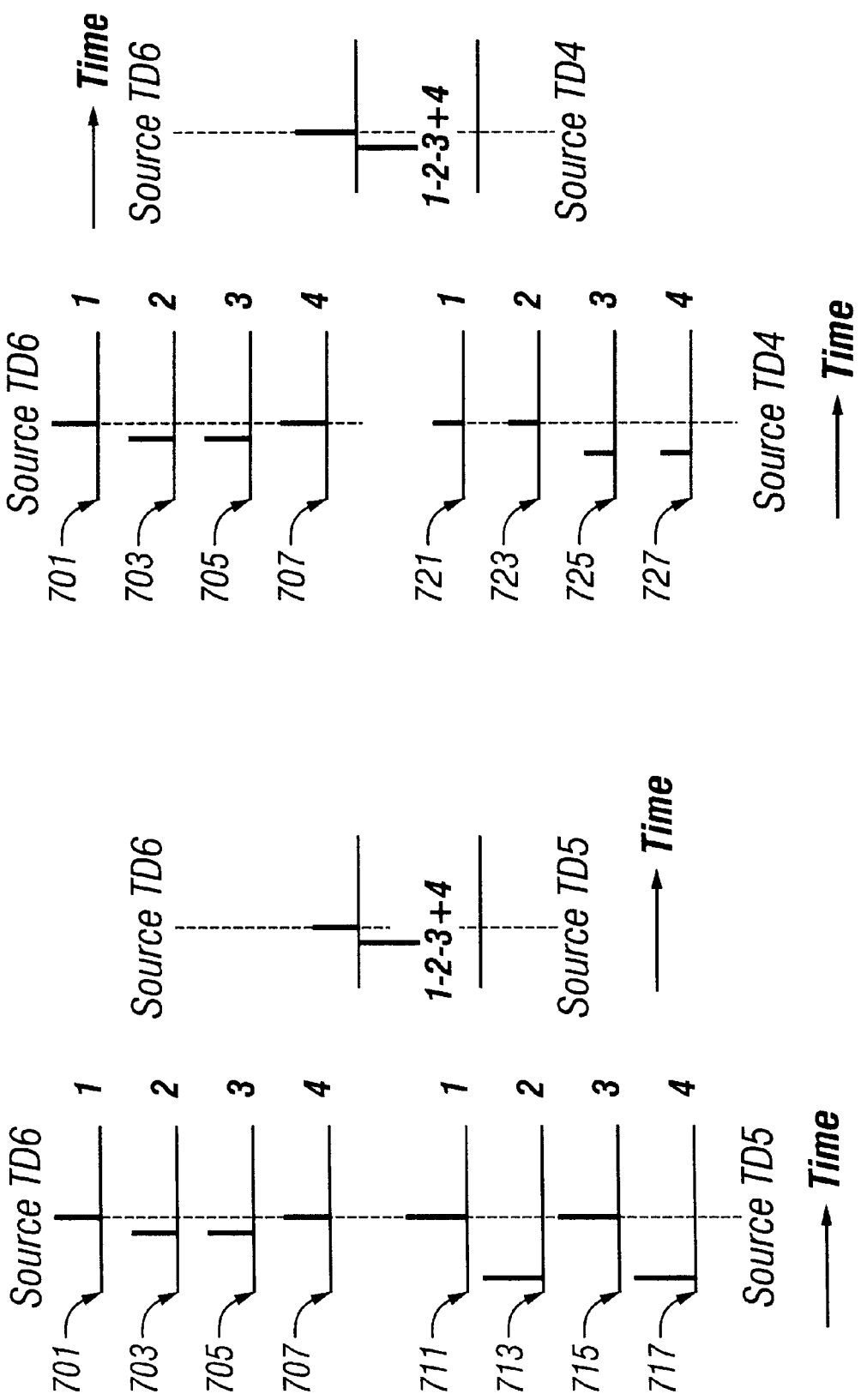
FIGS. 7A and 7B illustrate a three-source four-shot sequence with varying amplitudes and time delays.

In FIG. 7A and FIG. 7B three sources without ghosts are shown. All three sources have different amplitude and have been coded using different time delays. Compare FIG. 6A and FIG. 6B with FIG. 7A and FIG. 7B. In FIG. 7A and FIG. 7B the polarity decoding (1−2−3+4) is shown which preserves energy for Source TD6. Polarity decoding (1−2+3−4) preserves energy from source TD5 while polarity decoding (1+2−3−4) preserves energy from Source TD4.

Provided the pre-stack data are of sufficient quality, source separation can be further improved through interpolation techniques, not only in the CMP domain but in other domains as well. As an example, interpolation in the common offset domain will be demonstrated. The prestack data, sorted into common offset range gathers, consist of the contribution of many shots. The examples shown here have been sequences of 4 shots, like source TD4 in FIG. 7, numbered shot 1, shot 2 etc. In each shot, three delay coded sources (source 1, source 2 and source 3) fire simultaneously. The period of the sequence consists of four shots. During the fifth shot, the sources fire with the same time coding as in shot 1, and also the other shots in the cycle repeat. Shots having the same source time coding will be the series of shots 1, 5, 9, 13 and so on. The other series will be 2, 6, 10, etc., 3, 7, 11, etc., and 4, 8, 12 and soon.

The first step in the interpolation method is to sort the common offset sequence gathers into depopulated data subsets that contain only those shots that have the same source time coding, for example shots 1, 5, 9 and so on, for four shot sequences. Of course, there are 4 different ways in which the sources are combined in a shot, corresponding to the four different source time coding sequences, so four different depopulated subsets are formed.

The process then continues with the interpolation, by any known method, of three new traces in between two subsequent traces of the depopulated subset of a common offset series. For example, three traces between shot 1 and shot 5 create traces corresponding to newly interpolated traces from shots 2, 3 and 4. Another example is between shot 8 and shot 12 creating newly interpolated traces corresponding to shot 9, 10 and 11, and so on, such that the common offset data sets are repopulated with interpolated traces. In this manner four interpolated common offset data series traces pertaining to the same offset have been generated. At each trace location in addition to the one original, three interpolated traces have been created. The process may then be continued and completed with the polarity decoding for particular sources such that the sources are separated by the summation of the four interpolated common offset data series in the manner previously described.

It is possible that methods based on subtraction of data from different shots fail in the land situation due to the changing coupling conditions for both sources and detectors. However, the use of surface consistent deconvolution can provide a first order correction, not only increasing the consistency of the data but also improving the conditions for discrimination of the simultaneous sources.

A cause of cross talk in Vibroseis encoding methods is the distortion caused by the vibrator and the poor vibrator-earth coupling. The use of the present invention could alleviate this problem because the undesired source suppression is based on processing equal numbers of positive (as recorded) traces with negative traces (inverted in processing). The result of this encoding method is cancellation of all undesired source data, including the stationary part of the distortion. In addition the polarity reversal method cancels even harmonics in the desired source data. In contrast, the summation of positive and negative sweeps as generated in the field fails because the even distortion from the two sweeps is of same polarity. Subtraction of similar sweeps during processing is essential to combat the distortion problem.

No method works perfectly on all data cases, but there are advantages to both the polarity coding and the time delay coding methods, and their combination, that lead to suppression of any undesired energy that may leak through from the associated processing steps. Routine multi-trace processing algorithms may suppress some of this 'leakage' very effectively.

Persons skilled in the art will understand that the invention described herein is not to be unduly limited to the foregoing which has been set forth for illustrative purposes. Various modifications and alternatives will be apparent to those skilled in the art without departing from the true scope of the invention, as defined in the following claims.

What is claimed is:

1. A method of seismic surveying using simultaneously recorded seismic energy sources, the method comprising:
   (a) selecting a plurality of seismic energy sources to be used for surveying, each of said seismic energy sources containing a plurality of source elements;
   (b) positioning said plurality of seismic energy sources and associated seismic energy receivers at locations within a seismic survey area;
   (c) activating said plurality of source elements of each of said plurality of sources according to an activation sequence wherein said activation sequence is selected to enable separation of simultaneously recorded energy sources into separate source records; and
   (d) recording seismic energy generated by the plurality of activated seismic energy sources to form shot recordings.

2. The method of claim 1 further comprising time separating the plurality of activation times of said source elements using at least one predetermined time delay.

3. The method of claim 2 wherein the at least one predetermined time delay is substantially equal to a ghost delay time divided by an integer.

4. The method of claim 2 wherein the at least one predetermined time delay is less than the reciprocal of the maximum frequency of interest.

5. The method of claim 1 wherein said plurality of source elements in a seismic source are vertically separated.

6. The method of claim 1 wherein said source elements are positioned in staggered arrays.

7. The method of claim 1 wherein said source elements are activated to produce directionally enhanced seismic energy.

8. The method of claim 1 further comprising processing said returned seismic energy so that said returned seismic energy may be separated from shot records into separate source records.

9. The method of claim 8 wherein the returned seismic energy from separate source positions is separated using filtering.

10. The method of claim 9 wherein the returned seismic energy from separate source positions is separated using at least one filtering method chosen from the group consisting of i) FK filtering, ii) multi-channel filtering, and iii) radon transform filtering.

11. The method of claim 8 wherein the returned seismic energy is separated into separate source records by summation of shot recordings of returned seismic energy.

12. The method of claim 11 wherein the returned seismic energy from separate source positions is separated by inverting selected shot records to be included in summation of a group of shot recordings.

13. The method of claim 8 wherein the returned seismic energy from separate source positions is separated using filtering of shot records in combination with summation of shot records.

14. The method of claim 8 wherein the returned seismic energy from separate source positions is interpolated between source positions having the same delay sequence and amplitudes.

15. The method of claim 14 wherein the returned seismic energy from separate source positions is interpolated in at lot one data processing domain chosen from the group consisting of i) shot records, ii) CMP gathers, iii) common offset gathers, and iv) common receiver gathers.

16. A method for acquiring and processing seismic data in a seismic survey, the method comprising:
    (a) selecting a plurality of seismic energy sources to be used for surveying;
    (b) positioning a plurality of seismic energy sources and associated seismic energy receivers at locations within a seismic survey area;
    (c) activating said plurality of sources according to an activation sequence wherein at least one predetermined time delay is substantially equal to an integer multiple of a ghost delay time; and wherein said activation sequence is selected to enable separation of simultaneously recorded energy sources into separate source records; and
    (d) recording returned seismic energy generated by the plurality of activated seismic energy sources to form shot recordings.

17. The method of claim 16 wherein said at least one predetermined time delay is less than the inverse of the maximum frequency of interest.

18. The method of claim 16 further comprising processing said returned seismic energy so that said returned seismic energy may be separated from shot records into separate source records.

19. The method of claim 18 wherein the returned seismic energy from separate source positions is separated to individual source records using filtering.

20. The method of claim 19 wherein the returned seismic energy from separate source positions is separated using at least one filtering method chosen from the group consisting of i) FK filtering, ii) multi-channel filtering, and iii) radon transform filtering.

21. The method of claim 18 wherein the returned seismic energy is separated into individual source records by summation of shot recordings of returned seismic energy.

22. The method of claim 21 wherein the returned seismic energy from separate source positions is separated by inverting selected shot records to be included in summation of a group of shot recordings.

23. The method of claim 18 wherein the returned seismic energy from separate source positions is separated using filtering of shot records in combination with summation of shot records.

24. The method of claim 18 wherein the returned seismic energy from separate source positions is interpolated between source positions having the same delay sequence and amplitudes.

25. The method of claim 24 wherein the returned seismic energy from separate source positions is interpolated in at least one data processing domain chosen from the group consisting of i) shot records, ii) CMP gather, iii) common offset gathers, and iv) common receiver gathers.

26. A method for processing seismic data in a seismic survey, the method comprising:
    (a) selecting a plurality of seismic shot records from a seismic survey wherein a plurality of impulsive seismic sources activated at separate source positions have been contemporaneously recorded according to an activation sequence containing a delay time substantially equal to an integer multiple of a ghost delay time; and wherein said activation sequence is selected to enable separation of said contemporaneously recorded energy sources into separate source records, and
    (b) separating said seismic shot records into separate source records.

27. The method of claim 26 further comprising separating the seismic shot records into separate source records comprises at least one processing step chosen from the group consisting of i) summation, ii) interpolation, iii) inversion, iv) FK filtering, v) multi-channel filtering, vi) radon transform filtering.

28. The method of claim 27 wherein seismic energy from separate source positions is interpolated between contemporaneously recorded source positions having the same delay sequence and amplitudes.

29. The method of claim 28 wherein the returned seismic energy from separate source positions is interpolated in at least one data processing domain chosen from the group consisting of i) shot records, ii) CMP gathers, iii) common offset gathers, and iv) common receiver gathers.

* * * * *